(12) United States Patent  (10) Patent No.: US 9,100,385 B1
Reddy  (45) Date of Patent: Aug. 4, 2015

(54) MANAGEMENT AND SYNCHRONIZATION OF ELECTRONIC MEDIA CONTENT INFORMATION

(75) Inventor: Raymond Reddy, Toronto (CA)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 13/251,114

(22) Filed: Sep. 30, 2011

Related U.S. Application Data

(60) Provisional application No. 61/388,715, filed on Oct. 1, 2010.

(51) Int. Cl.
*G06F 15/16* (2006.01)
*H04L 29/06* (2006.01)

(52) U.S. Cl.
CPC ...................... *H04L 69/08* (2013.01)

(58) Field of Classification Search
USPC .......................................... 709/217
See application file for complete search history.

(56) References Cited

U.S. PATENT DOCUMENTS

| | | | | |
|---|---|---|---|---|
| 6,252,889 | B1* | 6/2001 | Patki et al. | 370/474 |
| 8,195,769 | B2* | 6/2012 | Miloushev et al. | 709/219 |
| 2003/0218996 | A1* | 11/2003 | Sumino et al. | 370/328 |
| 2007/0204003 | A1* | 8/2007 | Abramson | 709/217 |
| 2008/0263187 | A1* | 10/2008 | Casey et al. | 709/223 |
| 2009/0132542 | A1* | 5/2009 | Xu | 707/10 |
| 2009/0164655 | A1* | 6/2009 | Pettersson et al. | 709/231 |
| 2009/0203391 | A1* | 8/2009 | Mazor et al. | 455/466 |
| 2009/0282077 | A1* | 11/2009 | Thomas | 707/104.1 |
| 2009/0319904 | A1* | 12/2009 | Rensin et al. | 715/733 |
| 2010/0137006 | A1* | 6/2010 | Rofougaran | 455/457 |
| 2010/0146085 | A1* | 6/2010 | Van Wie et al. | 709/220 |
| 2010/0241728 | A1* | 9/2010 | Meyer et al. | 709/217 |
| 2010/0278381 | A1* | 11/2010 | Tessman et al. | 382/100 |
| 2011/0179136 | A1* | 7/2011 | Twitchell, Jr. | 709/217 |
| 2011/0231478 | A1* | 9/2011 | Wheeler et al. | 709/203 |
| 2011/0256905 | A1* | 10/2011 | Ryan | 455/556.1 |
| 2011/0320402 | A1* | 12/2011 | Agampodi et al. | 707/618 |
| 2012/0324011 | A1* | 12/2012 | Shepherd et al. | 709/204 |
| 2014/0040216 | A1* | 2/2014 | Thomas | 707/694 |

* cited by examiner

*Primary Examiner* — Brian P Whipple
*Assistant Examiner* — James Edwards
(74) *Attorney, Agent, or Firm* — Shumaker & Sieffert, P.A.

(57) ABSTRACT

Techniques are described for managing and synchronizing media content information. In one example, a method includes receiving media content information that identifies media content of the first client device, and receiving update information that includes an indication of a modification of at least a portion of the media content from the first client device, the update information conforming to a first information protocol utilized by a media management software application of the first client device. The method may also include transforming the update information to conform to a second information protocol utilized by a media management software application of a second client device, and sending the transformed update information to the second client device, the transformed update information enabling the second media management software application of the second client device to update media content of the second client device.

14 Claims, 4 Drawing Sheets

MANAGEMENT AND SYNCHRONIZATION OF ELECTRONIC MEDIA CONTENT INFORMATION

This application claims the benefit of U.S. Provisional Application No. 61/388,715, filed Oct. 1, 2010, the entire content of which is incorporated herein by reference.

TECHNICAL FIELD

The subject matter disclosed herein relates to management and synchronization of media content information in a computing environment.

BACKGROUND

Electronic media content may comprise a number of different forms, including audio content (e.g., digital audio files), visual content (e.g., digital video or image files), textual content (e.g., text documents), and machine executable software (e.g., software applications). Electronic media content may be managed at a computing platform via a media management application. The iTunes™ brand of media management application offered by Apple™ and the Media Player™ brand of media management application offered by Microsoft™ are contemporary examples of popular media management applications that may be used to manage electronic media content.

SUMMARY

Implementations for management and synchronization of electronic media content information are disclosed. As one example, a method is disclosed that includes receiving, by a computing device, media content information and an indication of a first client device, wherein the media content information identifies a first group of media content of the first client device, and receiving, by the computing device, update information that includes an indication of a modification of at least a portion of the first group of media content from the first client device, wherein the update information conforms to a first information protocol utilized by a first media management software application of the first client device. The method may also include transforming, by the computing device, the update information from conforming to the first information protocol to conforming to a second information protocol utilized by a second media management software application of a second client device, and sending, by the computing device, the transformed update information to the second client device, wherein the transformed update information enables the second media management software application of the second client device to update media content of the second client device based at least in part on the transformed update information.

In one example, a computer-readable storage medium is encoded with instructions that, when executed, cause one or more processors of a computing device to perform operations. The operations may include receiving, by the computing device, media content information and an indication of a first client device, wherein the media content information identifies a first group of media content of the first client device, and receiving, by the computing device, update information that includes an indication of a modification of at least a portion of the first group of media content from the first client device, wherein the update information conforms to a first information protocol utilized by a first media management software application of the first client device. The operations may also include transforming, by the computing device, the update information from conforming to the first information protocol to conforming to a second information protocol utilized by a second media management software application of a second client device, and sending the transformed update information to the second client device, wherein the transformed update information enables the second media management software application of the second client device to update media content of the second client device based on the transformed update information.

DETAILED DESCRIPTION

Figure 1:
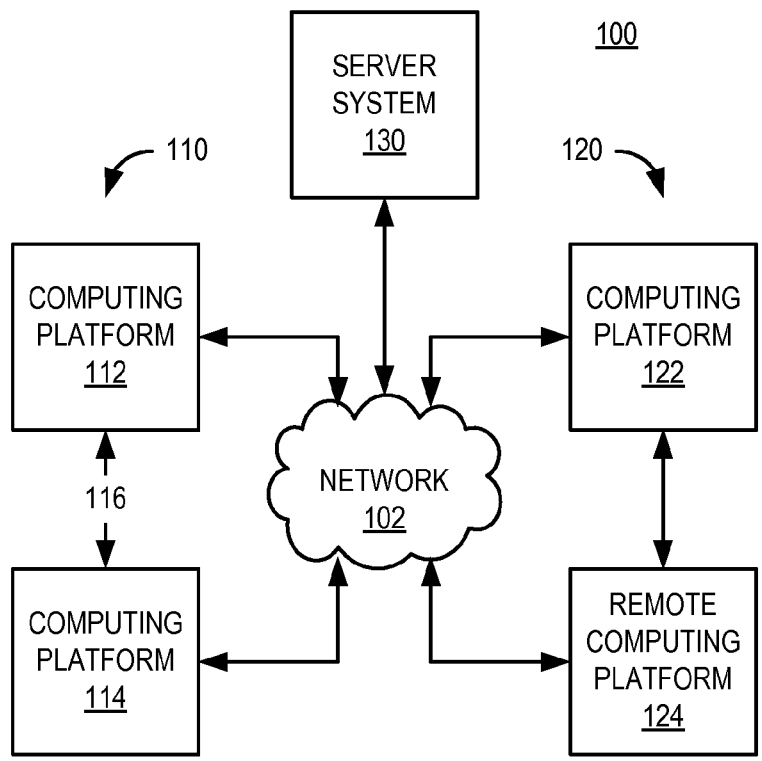
FIG. 1 depicts an example computing environment.

A computing network may include a number of clients each comprising one or more computing platforms. Some clients may implement a media management application as instructions (e.g., software, firmware, etc.) executed by a computing platform. Media management applications may enable client users to manage a variety of media content information associated with electronic media content items.

Some examples of media content information include the electronic media content items themselves (e.g., audio content, video content, etc.), metadata of electronic media content items (e.g., bibliographic information of the content, a client user's access history for the content, etc.), access rights for electronic media content items (e.g., content licenses or keys), organizational information defining a collection of one or more electronic media content items (e.g., playlists, albums, etc.), and preference information for electronic media content items (e.g., user defined volume settings, display settings, etc.), among other suitable information.

Some client users may desire to synchronize media content information across two or more computing platforms. Some client users may own or operate multiple computing platforms, such as, for example, a desktop computer and a mobile device. As another example, a client user may desire to share media content information with another client user utilizing a different computing platform.

In either scenario, separate instances of media content information may exist at or may be accessible via multiple computing platforms. Modifications to media content information performed at a first computing platform may result in a discrepancy with another instance of the media content information existing at or accessible via another computing platform if such media content information is not synchronized across computing platforms. The following description provides system, apparatus, and method implementations for synchronizing media content information across multiple computing platforms.

Synchronization between computing platforms after a modification to media content information may be time consuming for a client user or may be difficult for a client user to manage. As such, synchronization of media content information may be performed in at least some implementations according to a synchronization policy. For example, a client user may define a synchronization policy to be subsequently implemented by a computing platform in an automated or semi-automated manner. In this way, modification of media content information by a client user via a first computing platform may initiate modification to other instances of the media content information existing at or accessible via another computing platform without necessarily requiring further action by the client user. The following description provides system, apparatus, and method implementations for implementing a synchronization policy that may be at least partially defined by a client user.

In some scenarios, clients may utilize different types or brands of media management applications for managing media content. Some media management applications may support different information protocols than other media management applications. Synchronizing media content information across clients that support different information protocols may not be achieved in these scenarios unless appropriate conversion between information protocols is performed. The following description provides system, apparatus, and method implementations for converting between different information protocols in the context of synchronizing media content information.

Client users or content providers may utilize organizational information defining a collection of one or more electronic media content items to create, for example, audio or video playlists, photo albums, or otherwise organize content. Some collections may comprise a large or diverse range of electronic media content items. Client users, including those involved in the creation of a collection as well as those receiving a collection from another source may desire to filter the collection's electronic media content items based on one or more conditions. As one example, a client user may desire to filter a collection to identify electronic media content items for which the client currently possesses or does not current possess access rights. As another example, a client user may desire to filter a collection to identify electronic media content items which have been previously accessed by the client. The following description provides system, apparatus, and method implementations for filtering collections to identify subsets of electronic media content items within a collection.

FIG. 1 depicts an example computing environment 100. Computing environment 100 may include a communication network 102 enabling communication between two or more computing platforms. For example, computing environment 100 may include at least computing platform 112 and computing platform 122 which may communicate via communication network 102. Network 102 may comprise one or more of a wide area network (WAN) (e.g., the Internet), a local area network (LAN) (e.g., an intranet), or a personal area network (PAN). Network 102 may enable communication between two or more computing platforms using any suitable protocol, including wired and/or wireless communication protocols. In at least some implementations, communication between two or more computing platforms may be facilitated by a server system 130. Server system 130 may comprise one or more computing platforms, such as one or more network servers, for example.

In at least some implementations, a computing platform may be associated with a computing group that further comprises one or more other computing platforms. For example, computing platform 112 may comprise part of computing group 110 that further comprises computing platform 114. As one example, computing platform 112 and computing platform 114 of computing group 110 may be owned or operated by a common user or group of users. For example, computing platform 112 may comprise a user's desktop computer or a laptop computer and computing platform 114 may comprise the user's mobile device.

Computing platform 114 may communicate with other computing platforms of computing environment 100 via communication network 102. In at least some implementations, however, two or more computing platforms of a computing group may communicate via a personal area network (PAN) in addition to or as an alternative to communicating via communication network 102. For example, PAN 116 may facilitate wired or wireless communication between computing platform 112 and computing platform 114 via wired or wireless communication. As one example, PAN 116 may comprise a wired docking station that enables communication between a mobile device and a desktop computer. As another example, PAN 116 may facilitate wireless communication between computing platforms via radio wave (e.g., Bluetooth, Wi-Fi, etc.), optical, or other suitable form of wireless communication. FIG. 1 further depicts another computing group 120 that may comprise, for example, computing platform 122 and computing platform 124.

Figure 2:
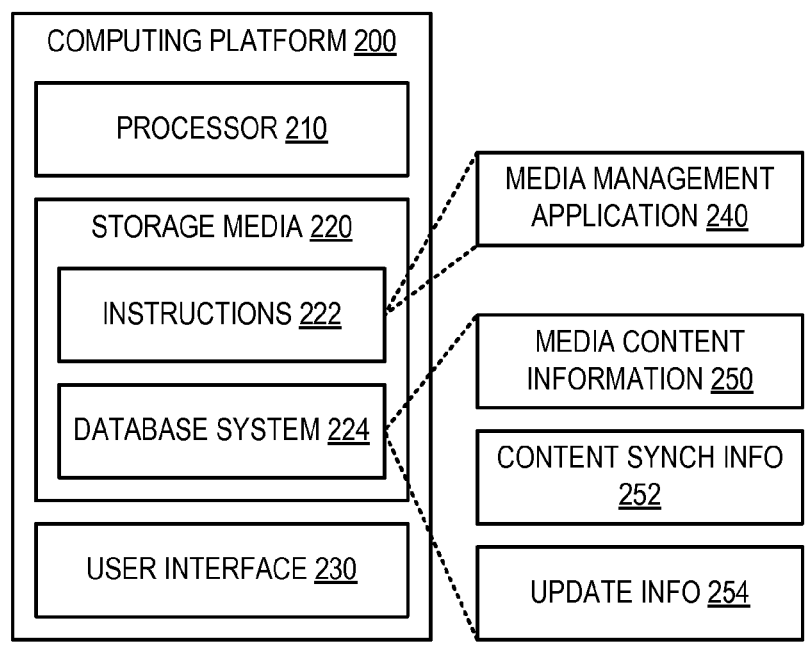
FIG. 2 depicts an example computing platform.

FIG. 2 depicts an example computing platform 200. Computing platform 200 may comprise a non-limiting example of one or more of the previously described computing platforms of FIG. 1. Computing platform 200 may comprise any suitable type of computing platform including, for example, one or more of a desktop computer, a notebook or laptop computer, a mobile computer such as a media player device, a camera device, a smart phone, etc., or a network server, among other suitable computing platforms.

Computing platform 200 may comprise one or more processors such as example processor 210. Computing platform 200 may further comprise storage media 220 having instructions 222 stored thereon that are executable by one or more processors such as example processor 210 to perform one or more methods, processes, or operations. For example, one or more of the methods of FIGS. 3, 4, and 5 may be performed, at least in part, by one or more processors executing instructions stored at a storage media.

In at least some implementations, instructions 222 may be described as comprising one or more modules or applications. As one example, instructions 222 may comprise a media management application 240 to manage media content information as will be subsequently described in greater detail. In at least some implementations, a media management application may enable a client user to access (e.g., view, play, perform, etc.) electronic media content items, organize electronic media content items, modify media content information, obtain access rights for electronic media content items, or perform other suitable tasks.

Storage media 220 may further comprise a database system 224 where information may be stored and/or retrieved by one or more processors such as example processor 210. Any suitable information may be stored at database system 224. As one example, media content information 250 may be stored at database system 224. As another example, content synchronization information 252 or update information 254 may be stored at database system 224. Such information may enable a computing platform to modify media content information, for example, via a media management application as will be subsequently described in greater detail.

Computing platform 200 may further comprise a user interface 230. User interface 230 may comprise one or more input devices and/or one or more output devices. Examples of input devices include a keyboard or keypad; a pointing device such as a mouse, a controller, etc.; a touch screen or touch pad;

an audio microphone; or a camera or optical sensor, among other suitable input devices. Examples of output devices include a graphical display such as a monitor, a television, a projected display, etc.; an audio speaker; or a haptic feedback device, among other suitable output devices.

Figure 3:
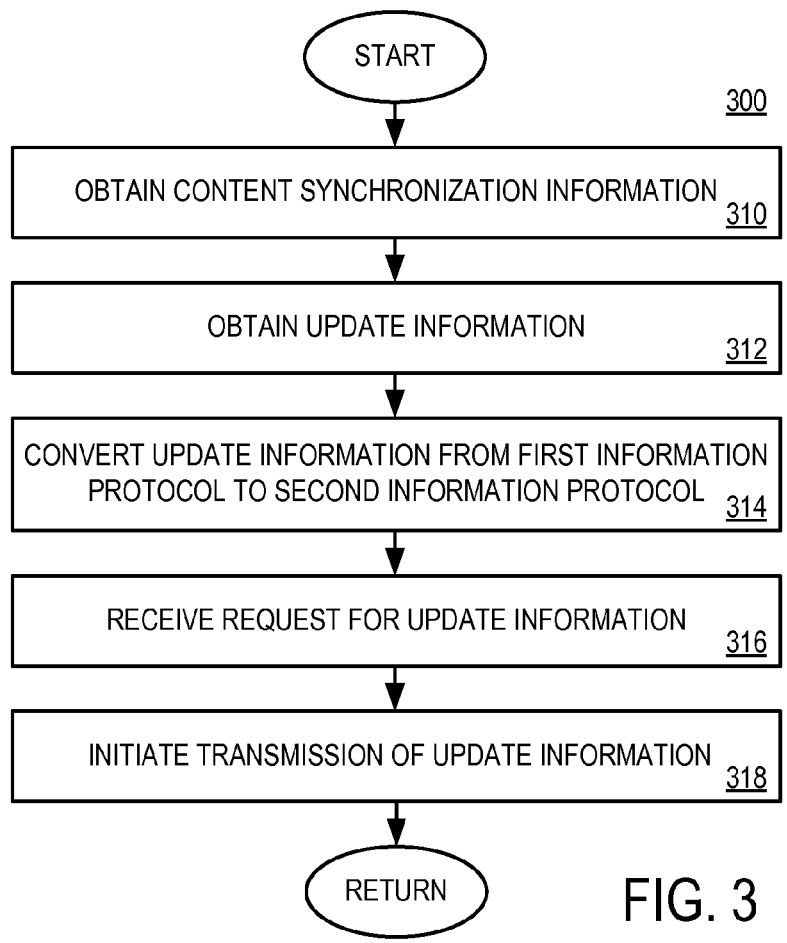
FIG. 3 depicts an example method to implement a synchronization policy to synchronize media content information across computing platforms.

FIG. 3 depicts an example method 300. In at least some implementations, method 300 may be performed by one or more computing platforms to obtain content synchronization information that defines a synchronization policy by which media content information may be synchronized across two or more computing platforms. Such a policy may be defined, at least in part, by a client user to initiate modification of media content information at a computing platform responsive to modification of another instance of the media content information at another computing platform. In this way, modification of media content information may be performed to synchronize two or more instances of the media content information across two or more computing platforms in accordance with a synchronization policy without requiring further input from a client user.

At 310, content synchronization information may be obtained. Content synchronization information may define a synchronization policy to be implemented by one or more computing platforms with respect to modifying or updating media content information at one or more other computing platforms. In at least some implementations, content synchronization information may indicate one or more clients to which the synchronization policy is to be applied. For example, in the context of computing environment 100 of FIG. 1, one or more clients indicated, for example, by content synchronization information received at operation 310 may comprise one or more of computing platforms 112, 114, 122, 124, etc.

In at least some implementations, content synchronization information may indicate media content information to which the synchronization policy is to be applied. For example, content synchronization information may indicate the electronic media content items themselves (e.g., audio content, video content, etc.), metadata of electronic media content items (e.g., bibliographic information of the content, a client user's access history for the content, etc.), access rights for electronic media content items (e.g., content licenses or keys), organizational information defining a collection of one or more electronic media content items (e.g., playlists, albums, etc.), and preference information for electronic media content items (e.g., user defined volume settings, display settings, etc.), among other suitable information.

In at least some implementations, content synchronization information may be obtained via a computing platform as one or more user inputs received via a user interface of the computing platform. For example, a client user may define a synchronization policy by indicating one or more clients and media content information. For example, a client user may select or provide one or more client identifiers that identify one or more clients to which the synchronization policy is to be applied. A client identifier may comprise any suitable identifier enabling two or more clients to be distinguished from each other. Some examples of client identifiers may include an account name or number, an email address, an IP address, or other suitable client identifier. A client user may similarly indicate media content information to which the synchronization policy is to be applied. For example, a client user may select or provide one or more electronic media content items, metadata, organizational information, etc. to be synchronized at one or more other computing platforms.

In at least some implementations, a computing platform may obtain content synchronization information from another computing platform. As one example, a server system such as server system 130 of FIG. 1 may obtain content synchronization information from another computing platform such as computing platform 112 of FIG. 1 via a communication network such as network 102. As another example, a computing platform such as computing platform 112 of FIG. 1 may obtain content synchronization information from another computing platform of a common computing group, such as computing platform 114 of FIG. 1. Accordingly, a synchronization policy may be implemented by the computing platform that initially obtained (e.g., from a client user) the content synchronization information defining the synchronization policy or the synchronization policy may be implemented by a computing platform that obtains the content synchronization information from another computing platform.

In at least some implementations, a computing platform that obtains the content synchronization information may create or designate a network location where update information may be accessed by a client indicated by the content synchronization information. For example, in the context of computing environment 100 of FIG. 1, server system 130 may create or designate a network location for each client indicated by the content synchronization information. As one example, a network location may comprise an inbox where a client may access update information. As another example, a network location may comprise a network location indicated by a uniform resource identifier, network address, or other suitable identifier. In at least some implementations, content synchronization information may be transmitted between two or more computing platforms via a communication network as one or more signals representing the content synchronization information.

In at least some implementations, content synchronization information may be stored at a computing platform implementing the synchronization policy. Stored content synchronization information may be referenced by a computing platform responsive to subsequent modifications of media content information indicated by update information. As one example, content synchronization information may be stored at a database system of a computing platform.

At 312, update information may be obtained. Update information may indicate modification of media content information. As one example, update information may indicate modification of organizational information defining a collection of one or more electronic media content items. A modification of media content information may be initiated by a client user in some examples. For example, a user may modify a collection by adding one or more electronic media content items to the collection and/or by removing one or more electronic media content items from the collection. As another example, a user may modify metadata associated with an electronic media content item, such as by changing a name or a user rating associated with the electronic media content item. It will be appreciated that update information may indicate modification of any suitable media content information.

In at least some implementations, update information may be stored at a computing platform. For example, a computing platform that initially obtains the update information may store the update information in a database system. In at least some implementations, update information may be transmitted to another computing platform for storage. For example, in the context of computing environment 100 of FIG. 1, server system 130 may obtain update information from another computing platform and may store the update information in a database system accessible by one or more clients indicated by the synchronization policy. For example, a computing platform may obtain update information indicating modification of a collection of electronic media content items, whereby the computing platform may publish the update information to a network location that is accessible by another computing platform hosting a client with which the collection is to be synchronized. In at least some implementations, a network location for accessing update information may comprise an inbox for a client that enables the client to retrieve the update information.

As previously described, some computing platforms may utilize different types or brands of media management applications that support different information protocols. Accordingly, at 314, update information may be converted from a first information protocol to a second information protocol in at least some implementations. For example, update information may be obtained at operation 312 via a first media management application of a first computing platform, whereby the update information may be formatted according to a first information protocol of the first media management application. Such update information may be converted from the first information protocol to a second information protocol utilized by a second media management application of a second computing platform.

In at least some implementations, a first information protocol may comprise a first application programming interface protocol of a first media management application and a second information protocol may comprise a second application interface protocol of a second media management application. In at least some implementations, update information may be converted from a first information protocol to a second information protocol that comprises a common schema supported by other media management applications. Such a common schema may be utilized to perform additional conversion of the update information to still other information protocols where appropriate.

Conversion of update information between two or more different information protocols may be performed by any suitable computing platform in the chain of communication. As one example, conversion of update information may be performed by a computing platform that initially obtains the update information. As another example, conversion of update information may be performed by a computing platform that obtains the update information from another computing platform. For example, a server system may obtain update information from another computing platform, whereby the server system converts the update information to an information protocol supported by a client indicated by content synchronization information associated with the update information. Such update information may be stored at a network location that is accessible by the client in either a converted or non-converted state. As yet another example, a computing platform hosting a client indicated by content synchronization information may obtain update information in an unconverted state, whereby the computing platform may convert the update information between information protocols to enable the update information to be interpreted by the media management application of the computing platform.

However, operation 314 may not be performed in at least some implementations. As one example, conversion of update information between information protocols may be not be performed if a common information protocol is utilized by computing platforms exchanging update information, such as two or more computing platforms utilizing a common type of media management application. As another example, conversion of update information may not be performed by a computing platform receiving the update information if conversion of the update information has already been performed by another computing platform. For example, a computing platform that obtains update information may perform conversion of the update information between information protocols before initiating transmission of the update information to another computing platform.

At 316, a request for update information (i.e., an update request) may be received in at least some implementations. For example, where the update information is stored at a network location, a computing platform hosting the network location (e.g., a server system) may receive a request for update information from a computing platform. For example, in the context of computing environment 100 of FIG. 1, computing platform 122 may request update information from server system 130, whereby server system 130 may enable computing platform 122 to access the requested update information. In at least some implementations, access to update information may be limited to only those clients to which a synchronization policy pertains, as indicated, for example, by content synchronization information. In at least some implementations, an update request may indicate an identity of an information protocol or information protocols supported by a media management application of the client requesting the update information. In this way, a computing platform that receives an update request (e.g., a server system) may perform a conversion of update information to an information protocol indicated by the update request before transmitting the update information to the requesting client. However, in at least some implementations, requests for update information may not be utilized, for example, where update information is transmitted to clients indicated by content synchronization information without specifically obtaining requests from the clients.

At 318, transmission of update information may be initiated. In at least some implementations, update information may be transmitted between two or more computing platforms via a communication network as one or more signals representing the update information. As one example, update information may be transmitted from a first computing platform that initially obtained the update information to a second computing platform hosting a client indicated by content synchronization information. In at least some implementations, transmission of update information may be facilitated via a server system. For example, in the context of computing environment 100 of FIG. 1, update information may be transmitted from computing platform 112 to server system 130 before such update information is transmitted to computing platform 122 in accordance with the synchronization policy.

Figure 4:
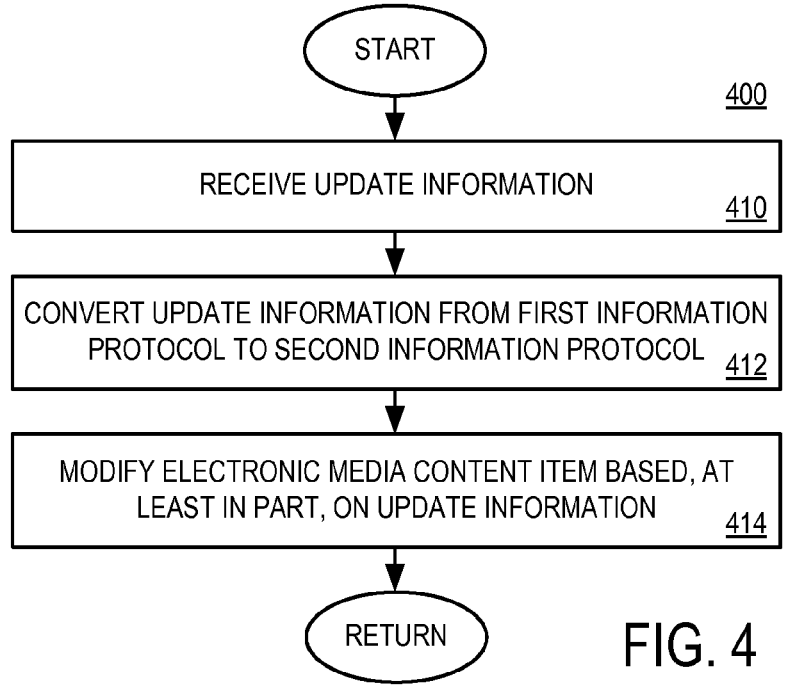
FIG. 4 depicts an example method to modify media content information based on update information obtained from another computing platform.

FIG. 4 depicts an example method 400. In at least some implementations, method 400 may be performed by a computing platform to modify media content information responsive to update information received from another computing platform.

At 410, update information may be received. As one example, update information may be received at a computing platform from another computing platform via a communication network. As previously described, update information may be transmitted between computing platforms as one or more signals representing the updating information.

At 412, update information may be converted from a first information protocol to a second information protocol. As previously described, for example, with reference to operation 314 of FIG. 3, update information may be converted between information protocols.

At 414, media content information may be modified based, at least in part, on update information received, for example, at operation 410. As one example, if the update information indicates modification of a collection of electronic media content items, a media management application of a computing platform that receives the update information may modify an instance of the collection residing at or accessible to the computing platform. As another example, if update information indicates modification of access rights to one or more electronic media content items, a media management application of a computing platform that receives the update information may access or discontinue access to the one or more electronic media content items in accordance with the modified access rights. It will be appreciated that any suitable modification of media content information may be performed by a computing platform responsive to update information obtained, for example, from another computing platform.

Figure 5:
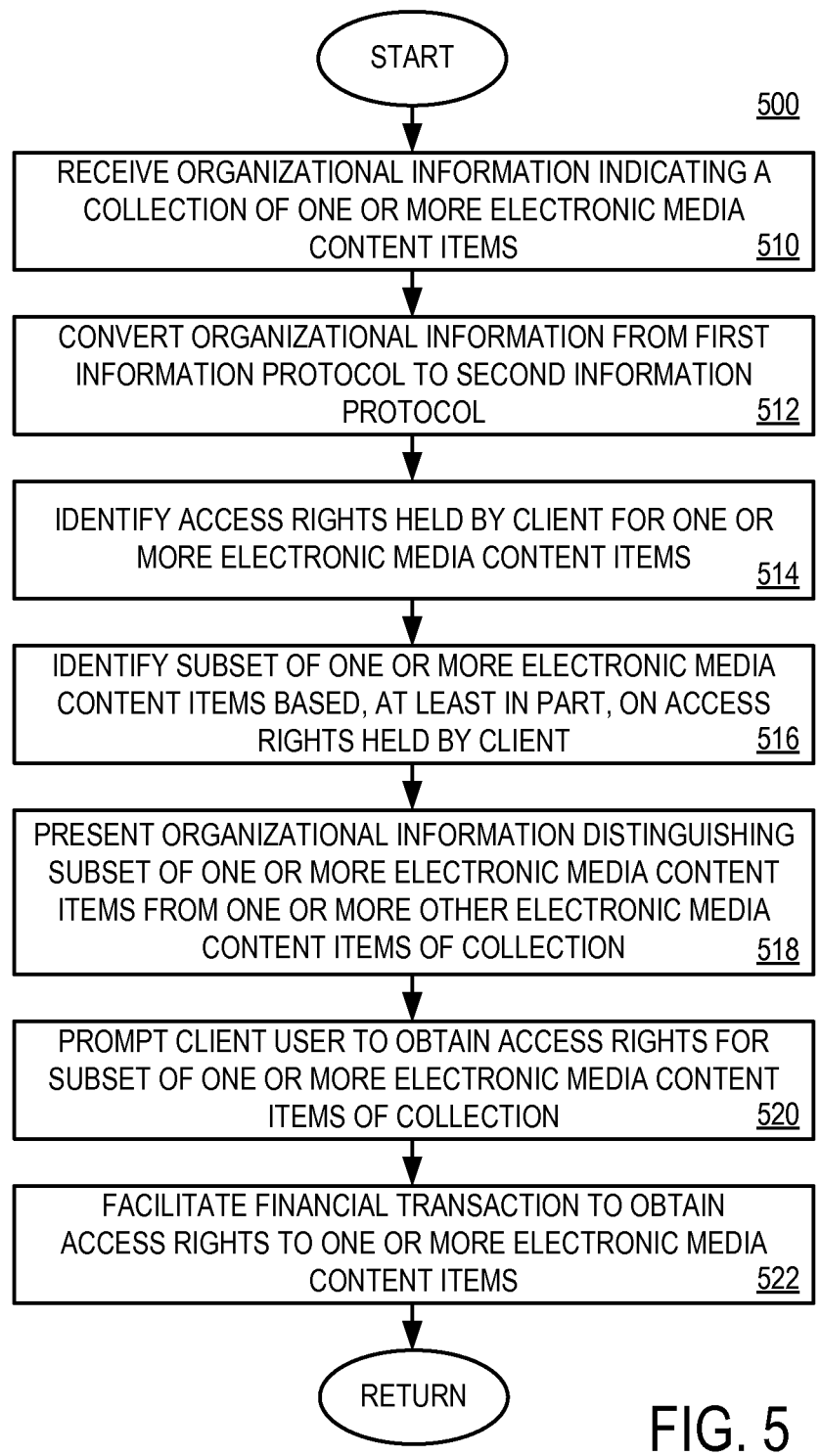
FIG. 5 depicts an example method to filter electronic media content items of a collection.

FIG. 5 depicts an example method 500. In at least some implementations, method 500 may be performed by a computing platform to obtain organizational information indicating a collection of one or more electronic media content items. A computing platform that obtains organizational information may identify a subset of one or more electronic media content items of a collection indicated by the organization information based, at least in part, on access rights currently held or possessed by a client of the computing platform. In this way, a client user may obtain access rights to electronic media content items of a collection that are not currently held by the client.

At 510, organizational information may be received. Organizational information may indicate a collection of one or more electronic media content items. As one example, organizational information may comprise a playlist of one or more audio or video content items. As another example, organizational information may comprise a photo album of one or more photographic images. As yet another example, organizational information may comprise a document file of one or more text documents.

In at least some implementations, organizational information may be received at a computing platform from another computing platform via a communication network. For example, organizational information may be transmitted between computing platforms as one or more signals representing the organizational information.

In at least some implementations, organizational information may comprise update information that may be used by a computing platform to modify an existing collection of one or more electronic media content items, for example, as previously described with reference to method 400 of FIG. 4. In at least some implementations, organizational information may comprise a media content storefront or library residing locally at a computing platform or accessible via a communication network. A media content storefront or library may enable a client user to browse electronic media content items.

In at least some implementations, organizational information may be converted at 512 from a first information protocol to a second information protocol. As previously described, for example, with reference to operation 412 of FIG. 4, organizational information (e.g., comprising update information) may be converted between information protocols. However, operation 512 may not be performed in at least some implementations.

At 514, access rights held by a client of a computing platform may be identified for one or more electronic media content items of a collection indicated by organizational information obtained, for example, at operation 510. In at least some implementations, a media management application of a computing platform may query a database system for an electronic media content item to determine whether access rights are currently held by the client for the electronic media content item. Such a database system may reside locally at the computing platform or may be accessible by the computing platform via a communication network.

In at least some implementations, a computing platform may further identify a type of access right or access rights held by a client for an electronic media content item. For example, an electronic media content item may utilize a number of different access rights. For example, access rights for an electronic media content item may comprise one or more of a right to view or play the electronic media content item, a right to copy the electronic media content item, a right to disseminate or share the electronic media content item with other clients, or a right to modify the electronic media content item, among other suitable access rights. Again, a computing platform may query a database system for an electronic media content item to determine which access rights are currently held by the client for a given electronic media content item.

As an alternative to or in addition to access rights identified at operation 514, an access history may be identified for one or more electronic media content items of a collection. An access history for an electronic media content item may indicate whether a client has accessed the electronic media content or the extent to which the client has accessed the electronic media content item. In at least some implementations, metadata associated with an electronic media content item may indicate how many times the electronic media content item has been accessed by a client. For example, metadata associated with a video content item may indicated whether a client has played the video content item or may indicate a number of times the client has played the video content item.

At 516, a subset of one or more electronic media content items may be identified based, at least in part, on the access rights held by a client and/or the access history of the client. In at least some implementations, a media management application of a computing platform may identify a subset of electronic media content items of a collection for which a client holds or does not hold at least some access rights. For example, access rights held by a client may be examined with respect to each electronic media content item of a collection to identify which electronic media content items the client currently holds access rights and which electronic media content items the client does not currently hold access rights.

Alternatively or additionally, a computing platform may identify a subset of electronic media content items of a collection for which a client holds a particular access right or a particular combination of access rights. For example, one or more electronic media content items of a collection may be identified for which a client currently holds a right to view or play the electronic media content item. In at least some implementations, the access right or combination of access rights queried under operation 516 may be user defined or defined by a system administrator. For example, a client user may filter a collection to identify which electronic media content items of the collection have access rights that are currently held or are not currently held by the client.

In at least some implementations, a media management application of a computing platform may identify a subset of electronic media content items of a collection based, at least in part, on an access history of the electronic media content items. For example, a client's access history may be examined with respect to each electronic media content item of a collection to identify which electronic media content items have been previously accessed by the client or which electronic media content items have not been previously accessed by the client.

At 518, organizational information may be presented in a manner that distinguishes a subset of one or more electronic media content items of a collection from one or more other electronic media content items of the collection. As one example, a subset of electronic media content items of a collection identified, for example, via operation 516 may be presented in association with an indicator that indicates the presence or absence of one or more access rights. As another example, a subset of electronic media content items of a collection may be presented in association with an indicator that indicates whether the electronic media content items have been previously accessed by a client or an extent to which such electronic media content items have been accessed by the client. In at least some implementations, electronic media content items of a collection that are filtered with respect to whether access rights are currently held by a client or an access history of the client may be presented via a graphical display or other suitable output device of a computing platform for the benefit of a client user.

In at least some implementations, a media management application may provide one or more selectable filters to enable a client user to select how electronic media content items of a collection are filtered responsive to access rights or access history. As one example, a client user may filter a collection to identify a subset of electronic media content items that the client user has already previewed, but not yet purchased the access rights so that client user may avoid previewing electronic media content items that he or she has already previewed. As another example, a client user may filter a collection to identify a subset of electronic media content items that the client's friends have previously purchased. In at least some implementations, a client's friends may be identified, for example, as the clients indicated by content synchronization information.

Figure 6:
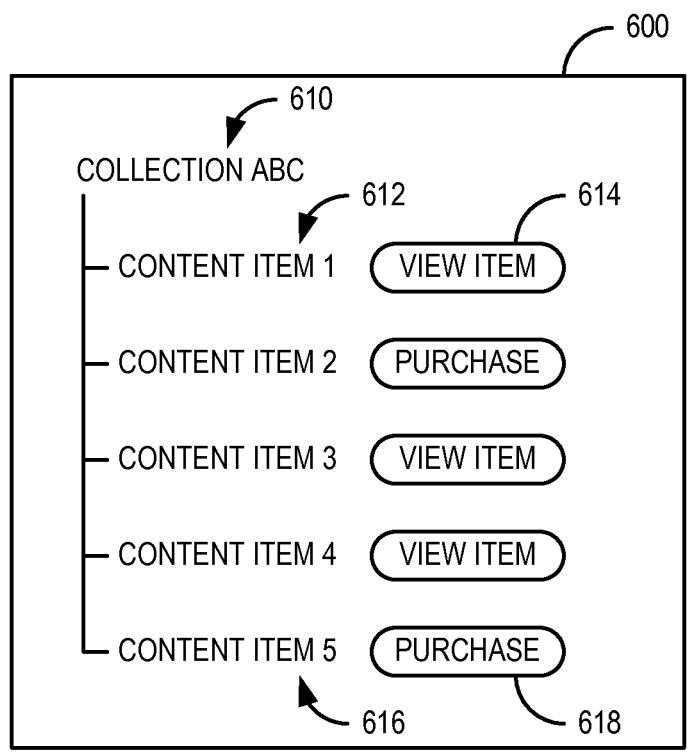
FIG. 6 depicts an example graphical user interface.

As one example, FIG. 6 depicts an example graphical user interface (GUI) 600. GUI 600 may be presented by a computing platform to distinguish a subset of electronic media content items of a collection from other electronic media content items based, at least in part, on access rights held by a client of the computing platform or based, at least in part, on an access history of the client. In this example, GUI 600 includes a collection 610 identified as "COLLECTION ABC". Collection 600 comprises five electronic media content items in this particular example, but may comprise any suitable number of electronic media content items. An electronic media content item 612 identified as "CONTENT ITEM 1" is presented in association with an indicator 614. Indicator 614 may indicate to a client user that the client currently holds access rights for electronic media content item 612. As one example, indicator 614 may comprise a selector that enables a user to view or play electronic media content item 612. Another electronic media content item 616 identified as "CONTENT ITEM 5" is presented in association with indicator 618. Indicator 618 may indicate to a client user that the client does not currently hold access rights for electronic media content item 616. As one example, indicator 618 may comprise a selector that enables a client user to obtain (e.g., purchase) one or more access rights for electronic media content item 616 that are not currently held by the client.

At 520, a client user may be prompted to obtain access rights for a subset of one or more electronic media content items of a collection that are not currently held by a client. As one example, FIG. 6 depicts how a selector (e.g., indicator 618) may enable a client user to obtain access rights for an electronic media content item. For example, a selector (e.g., indicator 618) may be selected by a client user to initiate a request for access rights for electronic media content item 616. In at least some implementations, a computing platform may request and obtain one or more access rights from another computing platform via a communication network responsive to a client user initiating a request for the one or more access rights.

At 522, a financial transaction may be facilitated to obtain access rights for one or more electronic media content items of a collection. As previously described, a client user may purchase access rights for one or more electronic media content items not currently held by the client. As one example, a financial transaction may comprise a client being charged a fee for obtaining one or more access rights for an electronic media content item. For example, access rights obtained by a client from an access rights manager residing, for example, at a different computing platform may be provided to the client in exchange for a financial fee. Accordingly, a financial transaction for access rights may be facilitated electronically between a client and an access rights manager via a communication network in at least some implementations.

In one example, a method includes receiving organizational information at a client of a communication network, the organizational information indicating a collection of one or more electronic media content items, and identifying a subset of the one or more electronic media content items based, at least in part, on access rights held by the client for the one or more electronic media content items. The method may include presenting the organizational information via an output device of the client in a manner that distinguishes the subset of the one or more electronic media content items from other electronic media content items of the collection. The method may also include prompting a client user of the client to obtain access rights to the subset of the one or more electronic media content items of the collection and facilitating a financial transaction initiated by the client user of the client to obtain the access rights to at least one electronic media content item of the subset of the electronic media content items of the collection. The method may additionally include receiving update information indicating modification of the organizational information, the update information formatted according to a first information protocol of a first media management application initiating the modification, converting the update information from the first information protocol to a second information protocol of a second media management application of the client, and performing the modification to the organizational information via the second media management application based, at least in part, on the update information formatted according to the second information protocol.

In one example, a method includes receiving, by a computing device, media content information and an indication of a first client device, wherein the media content information identifies a first group of media content of the first client device, and receiving, by the computing device, update information that includes an indication of a modification of at least a portion of the first group of media content from the first client device, wherein the update information conforms to a first information protocol utilized by a first media management software application of the first client device. The method may further include transforming, by the computing device, the update information from conforming to the first information protocol to conforming to a second information protocol utilized by a second media management software application of a second client device, and sending, by the computing device, the transformed update information to the second client device, wherein the transformed update information enables the second media management software application of the second client device to update media content of the second client device based at least in part on the transformed update information.

In some examples of the method, the computing device is a network server configured to communicate with at least one of the first client device and the second client device using a communication network.

In one example, the method may further include receiving, by the computing device, from the first client device, an indication to send the transformed update information to the second client device, and, in response to receiving the indication, sending, by the computing device, the transformed update information to the second client device using a communication network.

In some examples of the method, the media content information comprises metadata associated with an electronic media content item, and the indication of the modification of at least the portion of the first group of media content comprises an indication of a modification to the metadata associated with the electronic media content item.

In some examples of the method, the media content information comprises organizational information indicating a collection of one or more electronic media content items.

In one example, the method further includes receiving, by the computing device, an update request from the first client device using a communication network, wherein the update request identifies the second information protocol of the second media management software application of the second client device, and wherein transforming the update information from conforming to the first information protocol to conforming to the second information protocol comprises transforming the update information based on the identity of the second information protocol indicated by the update request.

In some examples of the method, the first information protocol comprises a first application programming interface protocol of the first media management application, and wherein the second information protocol comprises a second application interface protocol of the second media management application.

In some examples of the method, sending the transformed updated information to the second client device enables the second client device to modify an electronic media content item using the second media management application based at least in part on the transformed update information conforming to the second information protocol

What is claimed is:

1. A method comprising:
    receiving, by a computing device, media content information that identifies media content of a first client device of a user, wherein at least a portion of the media content of the first client device is included within media content of a second client device of the user;
    receiving, by the computing device, update information that includes an indication of a modification of at least a portion of the media content of the first client device of the user, wherein the update information conforms to a first application programming interface protocol of a first media management software application of the first client device, and wherein the first media management software application manages the media content of the first client device;
    transforming, by the computing device, the update information from conforming to the first application programming interface protocol to conforming to a second application programming interface protocol of a second media management software application of the second client device, the second application programming interface protocol being different from the first application programming interface protocol, and the second media management software application being different from the first media management software application; and
    sending, by the computing device, the transformed update information to the second client device, wherein the transformed update information enables the second media management software application of the second client device to update one or more items of the media content of the second client device based at least in part on the transformed update information.

2. The method of claim 1, wherein the computing device is a network server configured to communicate with at least one of the first client device and the second client device using a communication network.

3. The method of claim 1, further comprising:
    receiving, by the computing device, from the first client device, an indication to send the transformed update information to the second client device; and
    responsive to receiving the indication, sending, by the computing device, the transformed update information to the second client device using a communication network.

4. The method of claim 1,
    wherein the media content information comprises metadata associated with an electronic media content item, and
    wherein the indication of the modification of at least the portion of the media content of the first client device comprises an indication of a modification to the metadata associated with the electronic media content item.

5. The method of claim 1, wherein the media content information comprises organizational information indicating a collection of one or more electronic media content items.

6. The method of claim 1, further comprising:
    receiving, by the computing device, an update request from the first client device using a communication network, wherein the update request identifies the second application programming interface protocol of the second media management software application of the second client device, and
    wherein transforming the update information from conforming to the first application programming interface protocol to conforming to the second application programming interface protocol comprises transforming the update information based on the identity of the second application programming interface protocol indicated by the update request.

7. The method of claim 1, wherein sending the transformed updated information to the second client device enables the second client device to modify an electronic media content item using the second media management application based at least in part on the transformed update information conforming to the second application programming interface protocol.

8. A non-transitory computer-readable medium encoded with instructions that, when executed, cause one or more processors of a computing device to perform operations comprising:
    receiving, by the computing device, media content information that identifies media content of a first client device of a user, wherein at least a portion of the media content of the first client device is included within media content of a second client device of the user;
    receiving, by the computing device, update information that includes an indication of a modification of at least a portion of the media content of the first client device of the user, wherein the update information conforms to a first application programming interface protocol of a first media management software application of the first client device, and wherein the first media management software application manages the media content of the first client device;

transforming, by the computing device, the update information from conforming to the first application programming interface protocol to conforming to a second application programming interface protocol of a second media management software application of the second client device, the second application programming interface protocol being different from the first application programming interface protocol, and the second media management software application being different from the first media management software application; and sending the transformed update information to the second client device, wherein the transformed update information enables the second media management software application of the second client device to update one or more items of the media content of the second client device based on the transformed update information.

9. The non-transitory computer-readable medium of claim 8, wherein the computing device is a network server configured to communicate with at least one of the first client device and the second client device using a communication network.

10. The non-transitory computer-readable medium of claim 8, wherein the operations further comprise:
  receiving, by the computing device, from the first client device, an indication to send the transformed update information to the second client device; and
  responsive to receiving the indication, sending, by the computing device, the transformed update information to the second client device using a communication network.

11. The non-transitory computer-readable medium of claim 8,
  wherein the media content information comprises metadata associated with an electronic media content item, and
  wherein the indication of the modification of at least the portion of the media content of the first client device comprises an indication of a modification to the metadata associated with the electronic media content item.

12. The non-transitory computer-readable of claim 8, wherein the media content information comprises organizational information indicating a collection of one or more electronic media content items.

13. The non-transitory computer-readable medium of claim 8, wherein the operations further comprise:
  receiving an update request from the first client device using a communication network, wherein the update request identifies the second application programming interface protocol of the second media management software application of the second client device, and
  wherein transforming the update information from conforming to the first application programming interface protocol to conforming to the second application programming interface protocol comprises transforming the update information based on the identity of the second application programming interface protocol indicated by the update request.

14. The non-transitory computer-readable medium of claim 8, wherein sending the transformed updated information to the second client device enables the second client device to modify an electronic media content item using the second media management application based at least in part on the transformed update information conforming to the second application programming interface protocol.

\* \* \* \* \*